United States Patent [19]

Chelminski

[11] 3,997,021

[45] Dec. 14, 1976

[54] PRESSURIZED GAS DISCHARGING APPARATUS FOR USE AS A DOWN-BORE SEISMIC IMPULSE SOURCE

[75] Inventor: Stephen V. Chelminski, West Redding, Conn.

[73] Assignee: Bolt Associates, Inc., Norwalk, Conn.

[22] Filed: May 16, 1975

[21] Appl. No.: 578,329

[52] U.S. Cl. .............................. 181/106; 181/119; 181/142; 175/1; 340/17 R
[51] Int. Cl.$^2$ ...................... G01V 1/40; G01V 1/14
[58] Field of Search ................ 340/8 R, 17; 175/1, 175/205, 297; 181/106, 117, 119, 142

[56] References Cited
UNITED STATES PATENTS

| | | | |
|---|---|---|---|
| 2,424,108 | 7/1947 | Marten | 108/106 |
| 3,310,128 | 3/1967 | Chelminski | 340/17 |
| 3,909,776 | 9/1975 | Broping et al. | 181/119 |

*Primary Examiner*—Nelson Moskowitz
*Attorney, Agent, or Firm*—Parmelee, Johnson & Bollinger

[57] ABSTRACT

Improved pressurized gas discharging apparatus for use as a down-bore seismic impulse source provides a compact, efficient axially stacked assembly of components within a one piece elongated tubular shell housing having removable end closures. Within the tubular housing, removable partition means define a charge chamber and an operating chamber having an operating shuttle release means therebetween for sudden release of high pressure gas present in the charge chamber through a discharge port into the surrounding environment. Gas flow passageways for the supply of high pressure gas to the chambers extend longitudinally within the wall of the tubular housing and communicate with passages in the partition means. The shuttle release means may be actuated by a solenoid valve also removably positioned within the tubular housing for controlling gas flow through passageways also located within the walls of the tubular housing and within the partition means. The components are all advantageously removably positioned within the tubular shell without rigid attachment to one another thus permitting convenient disassembly for replacement to change the device's operating parameters or for repair. The housing is elongated and narrow with no external protrusions to interfere with insertion for convenient enabling use within a narrow borehole as a down-bore seismic impulse source. The housing forward end closure may be cone shaped to facilitate such insertion while the rear end closure includes means for connection to a source of pressurized gas and an electrical cable to power the solenoid valve.

16 Claims, 3 Drawing Figures

PRESSURIZED GAS DISCHARGING APPARATUS FOR USE AS A DOWN-BORE SEISMIC IMPULSE SOURCE

BACKGROUND OF THE INVENTION

1. Field of The Invention

This invention relates to an impulsive seismic energy source for use within deep bore holes and more particularly to pressurized gas discharging apparatus capable of insertion into narrow boreholes for generating seismic impulses therein through sudden discharge of high pressure gas.

The desirability for generating abrupt seismic impulses deep within a narrow borehole exists in seismic surveying and similar applications. For seismic surveying, powerful impulses are generated underground in boreholes and are utilized to investigate subsurface geological conditions and formations. Other applications for the use of sudden release of pressurized gas to generate abrupt powerful impulses within a borehole may include testing and signalling purposes as well as additional practical applications which may become more fully developed as the technology in this area advances.

It is expensive to drill boreholes in the ground for seismic surveying and the cost of drilling and the cost of the tooling increases rapidly for increasing borehole sizes above 3 inches in diameter. Therefore, it is desirable from a cost viewpoint to keep the diameter of such boreholes at 3 inches in diameter.

As used herein the term "pressurized gas" is intended to include any pressurized gas of pressurized mixture of gases which can be used in an airgun, for example such as compressed air, compressed carbon dioxide, compressed nitrogen, pressurized steam, and the like. In most cases it is easier and cheaper to use compressed air, supplied from a mobile compressor or from portable tanks, and air is usually the preferred pressurized gas to be employed. However, in certain cases, for example if the borehole is suspected to contain combustible vapors or inflammable gas, then it may be desirable to use a non-combustion-supporting gas, such as carbon dioxide or nitrogen. Also "pressurized" is intended to mean at an elevated pressure substantially above atmospheric pressure, for example, such as in the preferred range from 500 pounds per square inch (p.s.i.) up to 4,000 p.s.i., although higher of lower pressures of the pressurized gas may occasionally be used.

2. Description Of The Prior Art

Pressurized gas discharging apparatus, called an "airgun" for use in seismic surveying under water, including marsh land, swamp or mud areas is disclosed in my U.S. Pat. No. 3,808.822. A process and system for increasing the load bearing capacity of soil using pressurized gas discharging apparatus inserted in a hollow tubular member positioned in the soil and repeatedly abruptly releasing the pressurized air near the lower end of the member to produce powerful impulses for repeatedly impelling material, such as sand, gravel, concrete or the like which has been fed down the hollow member, outwardly into the soil to create a load bearing column of the material is disclosed in U.S. Pat. Nos. 3,707,848 and 3,793,844. Please see also U.S. Pat. No. 3,808,823 relating to apparatus for use in this process and system. The pressurized gas discharging apparatus described in the aforementioned patents have been referred to as airguns and the airgun is "fired" when the highly pressurized air of other gas it contains is caused to be abruptly released and discharged into the surrounding environment.

The airguns known prior to the present invention generally include, as operative components, charge chamber means for holding gas under high pressure, a release means which can be actuated to abruptly release the pressurized gas through discharge ports provided in the walls of the charge chamber, means for supplying gas under high pressure to the charge chamber means, and control means for causing the release means to be actuated to release the pressurized gas. The release means generally comprises a shuttle including a first (or releasing) piston positioned in the charge chamber for retaining the pressurized gas therein and a second (or controlling) piston positioned in an operating cylinder or control chamber in which pressurized gas acts against the shuttle piston to maintain it in "closed" position until it is to be released. The shuttle pistons are interconnected by a shaft which is reciprocally positioned between the operating cylinder and the charge chamber and is hollow for permitting a supply of pressurized gas to flow first to the operating cylinder and thence to the charge chamber.

The airguns may be self-firing by appropriate relative sizing of the exposed surface areas of the shuttle pistons or may be fired by operation of a solenoid valve for controlling flow of pressurized gas through various firing passages to cause the shuttle to be abruptly operated. A suitable solenoid valve means is described in U.S. Pat. No. 3,588,039. Both such modes of airgun operation are described in my U.S. Pat. No. 3,379,273 and the reader is referred thereto for a more detailed description of the airgun. More information about airguns may also be had by reference to my U.S. Pat. Nos. 3,249,177 and 3,653,460.

The operation of airguns within boreholes in soil involves special environmental consideration including the presence of potentially harmful surrounding materials such as dirt, grit and the like. In addition, economically drillable boreholes are generally of a narrow diameter, for example, as small as three inches, and pressurized gas discharging apparatus which is to be inserted therein is desirably of an outside diameter and shape which enables trouble-free insertion within such borehole. Thus, the airgun disclosed for the use described in U.S. Pat. Nos. 3,707,848 and 3,793,844 can enter a hollow pipe member having a diameter from about 6 inches up to 5 feet, and the airgun for use in underwater seismic surveying may have as large a diameter as is convenient for towing through the water, for example, over 5 inches to contain a high volume charge. None of the airguns shown in any of my above patents can fit within narrow economically drillable boreholes of 3 inches in diameter.

SUMMARY OF THE INVENTION

The present invention provides compact pressurized gas discharging apparatus, i.e. an airgun of unitary modular construction enabling its convenient use down a borehole as a seismic impulse source. More specifically, the present invention advantageously makes possible the use of apparatus which functions in a manner similar to the airguns described above to produce sudden seismic impulses while at the same time providing a structure which enables convenient insertion into economically drillable seismic survey boreholes of narrow diameter, i.e. 3 inches in diameter and facilitates assembly and disassembly of operative components for cleaning and repair and for replacement of change chambers of different lengths for variation of impulse characteristics.

The foregoing advantages are obtained according to the present invention by providing a unitary, i.e. one-piece, tubular body housing in which are positioned, in stacked axial linear relationship, the operative components of the pressurized gas discharging apparatus or airgun. The walls of the tubular body housing include gas passageways for supplying pressurized gas from an external source as well as gas passageways for conveying gas for operating, i.e. firing, the airgun, The tubular body housing is elongated and of a small diameter so as to fit within narrow diameter boreholes. The ends of the housing may be threaded to receive screw-on end closures for securely sealing the operative components or elements therein. The end closure may include a conical nose at the device leading end to facilitate insertion in the borehole while the end closure at the rear is adapted to receive a gas supply fitting from a hose, electrical connections and the like. The tubular body contains the gas discharge ports for abrupt release of high pressure gas. The operative components of the pressurized gas discharging apparatus, such as the charge chamber, the operating cylinder, the shuttle with its sealing piston and controlling piston, the solenoid valve means and partition means separating the various chambers are all positioned in a removable fashion in stacked relationship so as to enable quick and convenient removal for repair, cleaning and/or replacement of components or adjustment of component chamber capacities for changing the device characteristics and operating parameters.

Thus, it is a feature of this invention to provide downbore pressurized gas discharging apparatus for insertion in long narrow boreholes for sudden release of pressurized gas therein to generate strong inpulses useful for seismic surveying purposes.

A further feature of this invention is the provision of pressurized gas discharging apparatus having a smooth exterior unitary tubular body housing within which are positioned, in stacked linear axial relationship, the operative components of the device. Yet another feature of this invention is the provision of gas carrying passageways within the walls of the tubular body housing of the pressurized gas discharging apparatus.

A further feature of this invention is the provision of pressurized gas discharging apparatus which is an improvement over the airguns presently known for convenient and effective use within deep shafts and narrow boreholes to generate seismic impulses underground.

The various features and advantages of the pressurized gas discharging apparatus of the present invention will be more fully understood from a consideration of the following detailed description of a preferred embodiment thereof taken in conjunction with the accompanying drawings in which:

DETAILED DESCRIPTION OF THE DRAWINGS

Figure 1:
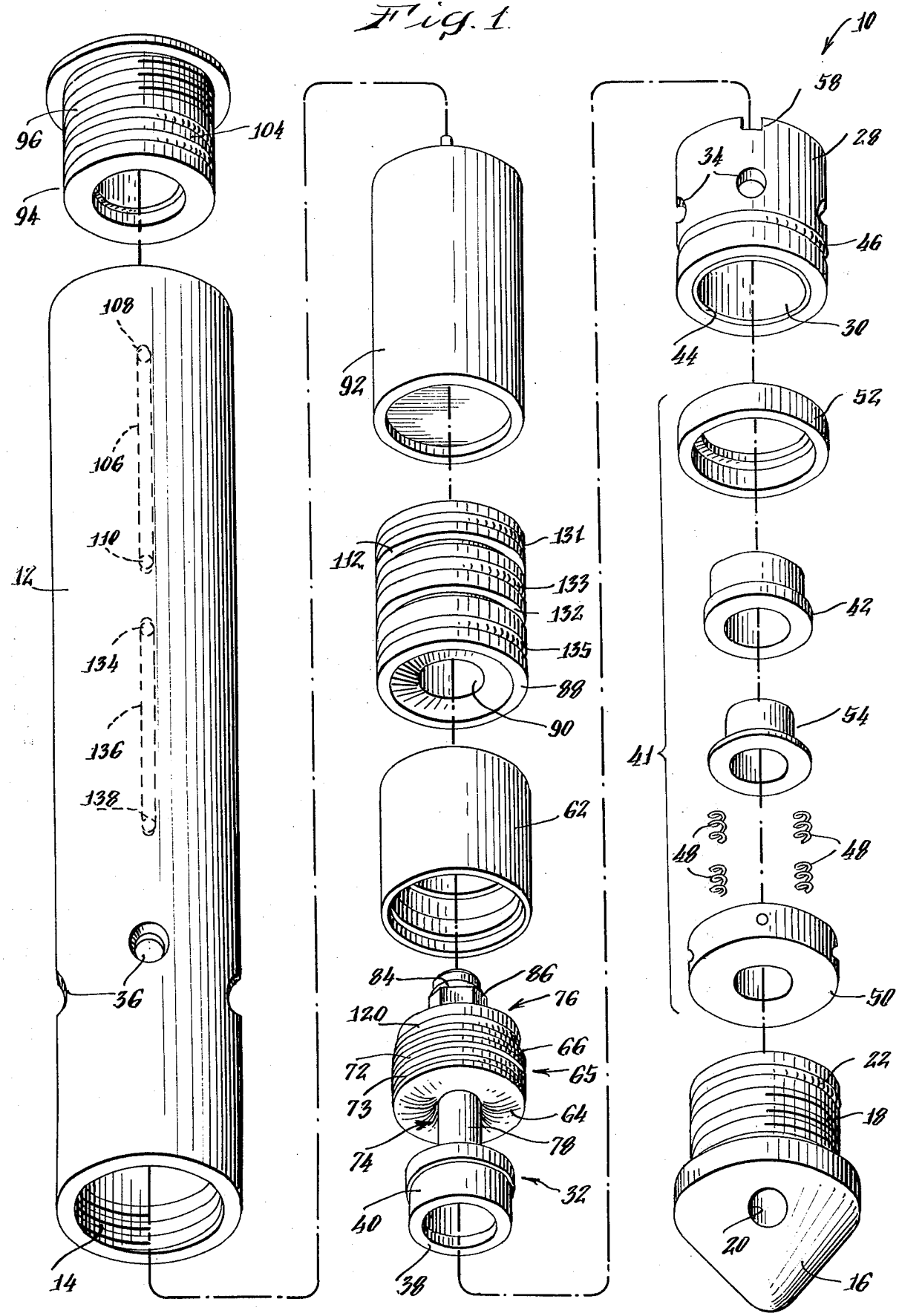
FIG. 1 is a longitudinally exploded view, of pressurized gas discharging apparatus according to the present invention showing the various components thereof in their relative positions ready for stacked assembly.
Figure 2:
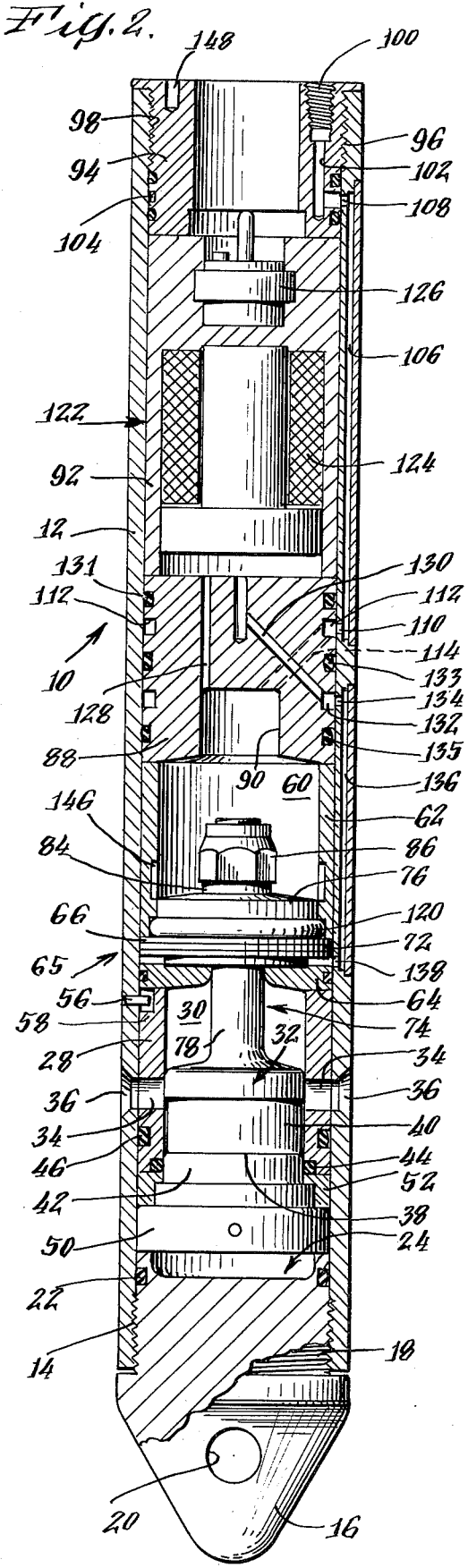
FIG. 2 is a longitudinal sectional view of the same pressurized gas discharging apparatus shown in FIG. 1 after being fully assembled ready for insertion in a borehole.

Referring to FIGS. 1 and 2, the pressurized gas discharging apparatus 10, which may be referred to as an airgun, includes an elongated one-piece cylindrical or tubular housing 12 forming the external shell thereof and defining, when closed, a main chamber therein. At its leading end, the cylindrical housing 12 contains a threaded portion 14 for receiving, as an end closure, the cone shaped nose piece 16. Referring to FIG. 1, the end closure nose 16 includes a threaded portion 18 for complementary engagement with the threaded portion 14 of the cylindrical housing 12. The nose 16 also includes an opening 20 through which may be placed a rod or other tool, not illustrated, for securely grasping the nose 16 for rotation when it is to be screwed onto or unscrewed from the cylindrical housing 12.

The normal stacked relationship of the components is indicated in the disassembled state in the exploded view of FIG. 1. In FIG. 2, there is seen the manner in which the components are assembled within the cylindrical housing 12 in a linear stacked relationship along the axis of the housing 12.

Referring to FIG. 2, the nose 16 is shown as joined to the housing 12 for closure of the leading end thereof, and an effective seal is provided by the O-ring 22. An end surface cavity portion 24 of the nose 16 defines, together with elements hereinafter described, a charge or firing chamber 26 capable of holding a charge of pressurized gas. The cavity 24 in various nosepieces 16 may be made of various sizes so that the volume of the charge of firing chamber 26 can be changed by the expedient of changing nosepieces for varying the characteristics of the seismic impulses to be generated.

A releasing cylinder sleeve 28 defines a release cylinder 30 (FIG. 2) and surrounds the release piston 32. The release sleeve 28 has a plurality of symmetrically spaced ports 34 aligned with the ports 36 in the cylindrical housing 12 to enable the discharge of compressed gas. In the position shown in FIG. 2, prior to firing or gas discharge, the lower lip 38 of the skirt 40 of the release piston 32 is in sealing engagement with a removable sealing assembly 41 (see also FIG. 1) including a movable seal ring 42 so as to hold a charge of pressurized gas in the charge chamber 26. A seal between the movable seal ring 42 and the cylinder sleeve 28 is provided by an O-ring 44. Another O-ring 46 provides a seal between the cylinder sleeve 28 and the cylindrical housing 12.

A plurality of seal springs 48 (FIG. 3) positioned within a retainer 50 urge the movable seal ring 42 against the piston rim or lip 38. Thus, the pressurized gas is held against exiting through the ports 34, 36 by engagement of the lower lip 38 of the release piston 32 with the seal ring 42 of the removable seal assembly 41. A retainer gland 52 cooperating with the sleeve 28 holds the O-ring 44 and provides a spacer between the sleeve 28 and the spring retainer 50 so that the elements may be assembled in stacked end-to-end relationship. The movable seal 42 may be made of a resilient material for example, such as Nylon, Delrin and the like, to assure a close fitting seal with the lower lip 38 and, therefore, there is also provided an internal retainer ring 54 of metal to hold the resilient seal 42 firmly in place. Accurate positioning and alignment of the releasing cylinder sleeve 28 within the cylindrical housing 12 is assured by a dowel pin 56 inserted through the cylindrical housing 12 and projecting into a recess 58 in the sleeve 28.

An operating cylinder 60 is defined by components or elements positioned adjacent those elements defining the release cylinder 30 and the charge chamber 26, as seen in FIG. 2. The operating cylinder 60 is lined with an operating cylinder sleeve 62. Positioned between the operating cylinder sleeve 62 and the release cylinder sleeve 28 is removable partition means 65 (see also FIG. 1). This removable partition means 65 includes a lower shaft gland annular retainer 64 and an upper shaft gland annular retainer 66. The lower annular retainer 64 and the upper annular retainer 66 hold a shaft gland seal 68 in place in an annular socket 70 formed in the upper retainer 66. A tight fitting seal is assured between the housing cylinder 12 and the retainers and between the retainers themselves by the O-ring seals 72 and 73. The retainers and gland seal together form the removable partition means 65 or barrier located between the operating cylinder 60 and the charge chamber 26.

A release shuttle 74 is located for reciprocal movement with respect to the operating cylinder 60 and the release cylinder 30 and the charge chamber 26. The release shuttle 74 includes the release piston 32 which is interconnected to an operating piston 76 through a hollow shaft 78. The operating cylinder 60 and the release cylinder 30 are maintained sealed from one another by means of the shaft gland 68 carrying an O-ring 80 firmly sealing against the shaft 78. The operating piston 76 is sealed to the hollow piston shaft 78 by an O-ring 82 held by a washer 84 and a nut 86. An upper housing partition 88 forms the top of the release cylinder 60. This upper housing 88 includes a recess 90 into which the upper portion of the shuttle 74, namely the shaft end and nut 86, enters upon operation of the shuttle. The upper housing 88 is held in position between the operating cylinder sleeve 62 and a solenoid valve body 92. The valve body 92 is in turn held in place by the upper end enclosure or top cap 94 having a threaded portion 96 which is screwed into the corresponding threaded portion 98 on the cylindrical housing 12.

The position and relationship of the various gas carrying passageways are best understood by reference to the operation of the gas discharging device. In preparation for gas discharge, as shown in FIG. 2, gas under pressure is introduced through a hose line connected to a compressor or other source of pressurized gas such as a gas cylinder, not shown, and connected to the inlet 100 in the upper end closure 94. The inlet 100 is connected to a passageway 102 formed within the upper end enclosure 94 and terminating in an annular recess 104 positioned on the circumferential peripheral surface of the end closure 94. The annular recess 104 communicates with the upper end of a high pressure gas supply passageway 106 located within the walls of the cylindrical housing 12 and extending longitudinally therein through a radial opening 108 in the wall of the housing 12 aligned with the annular recess 104. The gas supply passageway 106 terminates at its lower end in an opening 110 communicating with a first annular recess 112 located on the circumferential peripheral surface of the upper housing 80.

The annular recess 112 is connected to a diagonal gas supply passageway 114 within the upper housing 88 which terminates in the recess 90 for communication with the operating cylinder 60. The pressurized gas enters the operating cylinder 60 through the above described passageways. The annular recesses are provided in order to assure that communication with the opening 108 and 110 in the cylindrical housing 12 is obtained irrespective of the rotational position of the members 94 and 98.

The pressurized gas enters the charge chamber 26 by flowing through a constriction 116 and through an axial passageway 118 both located in the hollow piston shaft 78. As the pressurized gas flows into the operating cylinder 60, the constriction 116 briefly maintains the pressure in the cylinder 60 above the pressure in the charge chamber 26, assuring that the rim of the operating piston 76 remains firmly seated against an operating seal O-ring 120. The seal 120 is held by the upper annular retainer 66 which also holds the shaft gland 68 in its annular socket 70. After the chamber 26 is filled to the desired pressure, the pressurized gas discharging apparatus 10 is ready for gas release.

In the embodiment illustrated in FIGS. 1 and 2, gas release is accomplished by utilizing a solenoid valve 122, for example, such as shown in U.S. Pat. No. 3,588,039. The annular solenoid coil 124 provides a magnetic field upon application of electric current through a cable, not shown, connected to the connector 126. This electrical signal causes the valve 122 to be operated for interconnecting a pair of firing passageways 128 and 130 located in the upper housing 88.

Upon operation of the valve 122, shown schematically in FIG. 2, pressurized gas from operating cylinder 60 passes through the first firing passageway 128 and through the valve 122 into the second firing passageway 130. The second passageway 130 communicates with a second annular recess 132 located on the circumferential peripheral surface of the upper housing 88.

There are three O-ring seals 131, 133, and 135 in grooves encircling the upper housing 88, for sealing the first and second annular recesses 110 and 132 from each other and for isolating these recesses from the interior of the housing 12.

The annular recess 132 communicates with the opening 134 in the wall of the cylindrical housing 12 which is connected to a firing passageway 136 extending longitudinally within the wall of the tubular shell 12. The passageway 136 terminates in an opening 138 communicating with an annular recess 140 located on the peripheral surface of the upper annular retainer 66 which is connected to a diagonal firing passageway 142 within the retainer 66 which terminates in an annular trigger recess 144 located at the opposite side of the operating piston 76 from the cylinder 60.

Figure 3:
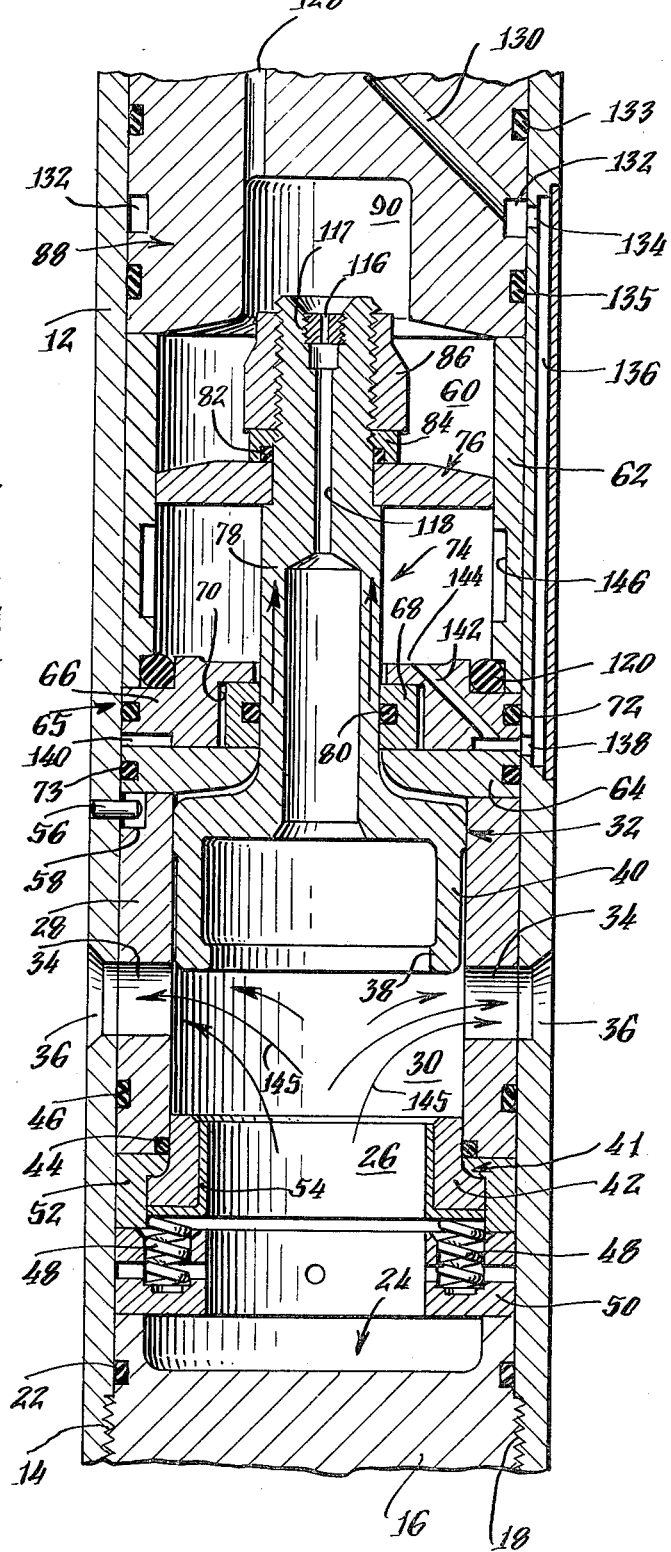
FIG. 3 is an enlarged sectional view for further illustration of structural features.

The application of the gas pressure from the operating cylinder 60 to the triggering chamber 144 through the passageways above described tends to equalize the pressure exerted on opposite faces of the piston 76 to allow the shuttle 74 to accelerate away from the seal ring 120 and to leave the seal 42, thus suddenly opening the ports 36 to abruptly release the pressurized gas from the charge chamber 26, as shown in FIG. 3 by the arrows 145.

Bypass passages 146, formed by cutouts in the operating cylinder sleeve 62, serve to aid in equalizing the pressure on opposite faces of the operating piston 76 after it has begun accelerating away from the seal 120.

After sudden gas release, as shown in FIG. 3 by arrows 145, the gas remaining trapped in the operating cylinder 60 above the bypass passages 146 is compressed by the fast traveling operating piston 76, thus serving to decelerate the shuttle 74 and then return it to its initial position shown in FIG. 2.

As an alternative to actuating the shuttle release 74 by means of a solenoid valve, the gas discharging device may be made self-firing. In that case, the solenoid valve and firing cable be omitted as may the operating or firing passageways 128, 130, 136, 142 and the triggering chamber 144. To make the device self-firing, the effective area of the releasing piston 32 exposed to the pressurized gas in the charge chamber 26 is made greater than that of the operating piston 76 exposed to the pressurized gas in the operating cylinder 60. Accordingly, when the pressure in the chamber 26 has risen up substantially to that in the cylinder 60, the seal between the O-ring 120 and the operating piston 76 becomes open to allow the high pressure gas in the cylinder 60 to communicate with the lower face of the piston 76, and the shuttle 74 is accelerated away from the seal 120 and from the seal 42 and abruptly opens the ports 36 to suddenly release the pressurized gas. The bypass passages 146 in the cylinder sleeve 62 allow free communication for gas to pass from the cylinder 60 into the space beneath the traveling piston 76. The time intervals between release when the gun is self-firing is controlled by the constriction 116 in a removable plug 117. The greater the constrictive effect, i.e., the smaller the diameter of the passageway 116, the longer the interval between gas discharges, and vice versa.

The end cap 94 may be provided with connecting means, such as a plurality of screw eye sockets as shown at 148, to support the device for lowering into a borehole, in addition to the air hose and electrical cable connection means. Thus, there are no protrusions on the cylindrical periphery of the tubular housing, due to connection fittings or arising from fastening means required to join operative components together. This enables the airgun 10 to be easily inserted in small diameter boreholes for use as a down-bore seismic impulse source. Should the apparatus 10 require repair, cleaning or replacement of parts, it is easily dismantled and reassembled by virtue of the axial stacked arrangement of removable elements. Thus, use in the field is greatly facilitated.

The cylindrical housing 12 is the embodiment shown in FIGS. 1 and 2 is made of stainless steel and has an outside diameter (O.D.) preferably not exceeding 2⅝ths of an inch; so that it will conveniently fit down within a 3 inch diameter borehole in the earth. This illustrative embodiment is actually slimmed down to an O.D. of only 2.50 inches so as to be lowered freely down into a borehole in the earth having such a diameter.

I claim:

1. In pressurized gas discharging apparatus having a chamber for holding gas under high pressure, discharge ports and actuatable release means for abruptly releasing powerful impulses of pressurized gas from the chamber through the discharge ports into the surrounding environment, the invention enabling convenient use of such apparatus as a seismic impulse source within a narrow borehole in the earth and providing a compact apparatus having an efficient stacked assembly of components in a unitary tubular shell comprising:
   an elongated unitary tubular shell,
   a plurality of removable components within said tubular shell, including partition means removably positioned within the tubular shell dividing the interior thereof into a first chamber and a second chamber,
   said tubular shell having a plurality of openings therein in the region of the second chamber defining discharge ports communicating with the second chamber and with the exterior of said shell,
   release means positioned within and movable in the second chamber providing sudden release of pressurized gas through the discharge ports upon actuation of the release means,
   a seal assembly removably positioned within said tubular shell and adapted to be engaged by said release means,
   gas flow passageway means connecting the first and second chambers providing communication therebetween,
   said tubular shell having a pressurized gas supply passageway located within a wall portion thereof and communicating with said first chamber for supplying high pressure gas to the first chamber from an external supply of pressurized gas,
   a removable end closure removably secured at one end of said tubular shell for holding the removable components therein.

2. Improved pressurized gas discharging apparatus as claimed in claim 1 wherein said removable end closure is a nose piece having an inner end surface forming a wall portion defining a part of the second chamber.

3. Improved pressurized gas discharging apparatus as claimed in claim 2 wherein said end surface of the end closure is concave providing a cavity for increasing the volume of the second chamber over that obtained with a flat end surface whereby different chamber volumes may be obtained by using end closures having differently sized cavities.

4. Improved pressurized gas discharging apparatus as claimed in claim 2 wherein the end closure nose piece is cone shaped to facilitate insertion of the apparatus into a narrow borehole.

5. Improved pressurized gas discharging apparatus as claimed in claim 1 wherein the removable end closure is threaded and is adapted to be secured to the tubular shell by screwing therein, and said removable end closure has a configuration adapted to be engaged by a tool for convenience in screwing and unscrewing it.

6. Improved pressurized gas discharging apparatus as claimed in claim 1 wherein,
   an upper housing is removably positioned within the tubular shell for forming an end of the first chamber located at its end farthest from the second chamber,
   said upper housing having a pressurized gas supply passageway located therein.
   an annular recess located on the circumference of said upper housing communicating with the passageway therein,
   the tubular shell wall having an opening communicating with said annular recess when the upper housing is positioned therein and also communicating with the pressurized gas supply passageway within the shell wall,
   said tubular shell passageway, said wall opening, said annular recess and said upper housing passageway together forming a continuous closed passageway for the supply of high pressure gas into the first chamber.

7. Improved pressurized gas discharging apparatus as claimed in claim 1 wherein, the release means comprises a shuttle operatively positioned between the first chamber and the second chamber, the shuttle having a shaft passing through said removable partition means and movable with respect thereto, a gas releasing piston mounted on one end of the movable shaft and movably positioned in the second chamber for engaging said seal assembly to seal the discharge ports and movable for uncovering the discharge ports to permit sudden release of high pressure gas through said ports, and an operating piston mounted on the other end of the movable shaft and movably positioned in the first chamber to operate the shuttle.

8. Improved pressurized gas discharging apparatus as claimed in claim 7 wherein, an upper housing is removably positioned within the tubular shell forming an end of the first chamber at its end farthest from the second chamber, a solenoid valve removably positioned within the tubular shell adjacent to the upper housing for triggering the actuation of said operating piston, said upper housing having a gas flow passageway therein for connecting the first chamber with the solenoid valve for providing communication therebetween, said upper housing having a further gas flow passageway located therein connecting said valve with an annular recess located on the circumference of said housing for providing communication therebetween.

second axially extending longitudinal gas flow passageway located in the wall of the tubular shell, said second axially extending longitudinal gas flow passageway providing communication with said annular recess through an opening in the tubular shell wall and providing communication with a region between said partition means and the operating piston for triggering the movement of said operating piston.

9. Improved pressurized gas discharging apparatus as claimed in claim 8 wherein, said removable partition means separating the first and second chambers contains an annular recess located on its circumference, said second axially extending longitudinal gas flow passageway communicates with said annular recess in said removale partition means through an opening in the tubular shell wall, and said removable partition means has an internal passageway therein for interconnecting said annular recess thereon with said region between the operating piston and said partition means.

10. Imporved pressurized gas discharging apparatus for use as a down-bore seismic impulse source in narrow bore-holes and having individual operative components removably assembled in an axially stacked manner within a tubular shell comprising:

an elongated tubular shell having at least one open end, an end closure removably secured for closing the open end of said tubular shell, first partition means removably positioned within the tubular shell axially spaced from the end closure and separating the interior of said tubular shell into an operating chamber and a charge member, gas discharge ports located in the tubular wall providing communication between the charge chamber and the exterior of said tubular shell, gas releasing shuttle means operatively mounted between the operating and charge chambers for reciprocal movement therein.

the shuttle means having a hollow shaft defining a gas flow passageway between the operating chamber and the charge chamber, said shuttle means including a gas releasing piston mounted on a shuttle shaft and positioned in the charge chamber and being movable for covering and uncovering the discharge port to permit sudden release of high pressure gas from the charge chamber, operating piston means mounted on the shuttle shaft and movably positioned in the operating chamber for operating the shuttle means, second partition means removably positioned within the tubular housing and forming an end of the operating chamber, control means for causing the operating piston to operate the shuttle, a pressurized gas supply passageway means located within the second partition means, one end of which communicates with the operating chamber and the other end of which communicates with an opening in the interior of the tubular shell wall providing communication between one end of an axially extending longitudinal passageway located within the tubular shell wall the other end of which communicates with a source of pressurized gas located exteriorly of the apparatus, whereby pressurized gas may be supplied into the operating chamber.

11. Improved pressurized gas discharging apparatus as claimed in claim 10 wherein said second removable partition means is maintained axially spaced from the first partition means by a cylindrical sleeve removably mounted within said tubular shall forming a lining of the operating chamber.

12. Improved pressurized gas discharging apparatus as claimed in claim 10 wherein the means causing the operating piston to operate the shuttle includes a solenoid valve removably positioned within the tubular shell adjacent the second partition means, and further including first firing gas flow passageway means located within the second partition means connecting the operating chamber and the solenoid valve for communication therebetween, second firing gas flow passageway means located within the second partition means, firing gas flow passageway means located within the first partition means, axially extending longitudinal firing gas flow passageway means located within the tubular shell wall one end of which communicates with the second firing gas flow passageway means within the second partition and the other end of which communicates with the operating chamber through the firing gas flow passageway within the first partition at a location between the operating piston and the first partition means.

13. Improved pressurized gas discharging apparatus as claimed in claim 12 wherein the partition means gas passageway means include annular recesses located on the partition means circumference surfaces in order to provide communication with the gas passageway in the tubular housing wall irrespective of rotational alignment.

14. Improved pressurized gas discharging apparatus as claimed in claim 13 further including a second end closure means sealing the other end of the tubular housing, the end enclosure means having connection means for connecting an external source of pressurized gas supply thereto and a passageway, including an annular recess, for communicating with the longitudinal gas supply passageway means in the housing wall.

15. In a pressurized gas discharging gun adapted for generating seismic energy impulses and having a firing chamber for holding the pressurized gas, an operating cylinder chamber, a release cylinder, and a movable shuttle with an axial passage extending therethrough, the invention enabling usage of such a gun down a narrow bore hole in the earth for seismic surveying, said invention comprising
- an elongated cylindrical housing internally threaded at its upper and lower ends,
- an upper end closure screwed into the upper threaded end of the cylindrical housing,
- a nose piece screwed into the lower threaded end of the cylindrical housing,
- a plurality of members slidable into said housing resting one upon another therein and being held in said cylindrical housing between said upper end closure and said nose piece,
- said members including:
- a solenoid valve near said upper end closure,
- an upper housing below said solenoid, said upper housing having first and second annular recesses encircling the periphery thereof,
- an operating cylinder sleeve below said upper housing, said operating cylinder sleeve surrounding the operating cylinder chamber,
- means forming a partition below said operating cylinder sleeve,
- a release cylinder sleeve below said partition means, said release cylinder sleeve surrounding the release cylinder chamber, said partition separating said operating cylinder chamber from said release cylinder chamber, said partition having a third annular recess encircling the periphery thereof,
- the shuttle having a shaft extending through said partition with an operating piston located in said operating cylinder chamber and being movable axially therein and with a release piston located in said release cylinder chamber and being movable axially therein,
- the firing chamber being within said housing located below said release piston near said nose piece,
- said elongated cylindrical housing having a supply passage therein extending downwardly and being positioned for communicating with said first annular recess in the periphery of said upper housing for feeding pressurized gas into said first annular recess, and said upper housing having a supply passage extending downwardly therein for feeding the pressurized gas from said first annular recess into said operating cylinder chamber,
- the passage in said shuttle extending down therethrough for feeding the pressurized gas from said operating cylinder chamber down into said firing chamber,
- said upper housing having a firing passage extending from said operating cylinder chamber to said solenoid valve and another firing passage extending from said solenoid valve to said second annular recess,
- said elongated cylindrical housing also having a firing passage therein and being positioned for communicating with said second annular recess and extending downwardly for communicating with a third annular recess in the periphery of said parition, and
- said partition having a firing passage extending from said third annular recess to the lower side of said operating piston, whereby operation of said solenoid valve causes pressurized gas to flow from said operating cylinder chamber through said firing passages to the lower side of said operating piston for accelerating said shuttle upwardly to move said release piston upwardly,
- said release cylinder sleeve having a plurality of ports therein and being positioned for communicating with a plurality of corresponding ports in said elongated cylinder housing for discharging pressurized gas from said firing chamber to the exterior of said gun after said release piston has accelerated upwardly.

16. An improved pressurized gas discharging device adapted for use down a bore hole for seismic surveying or the like as claimed in claim 15, in which said elongated. cylindrical housing has a diameter not exceeding 2⅝ths of an inch.

* * * * *